US011398972B2

(12) United States Patent
Shen et al.

(10) Patent No.: US 11,398,972 B2
(45) Date of Patent: Jul. 26, 2022

(54) TRANSPORT ENDPOINT SEGMENTS FOR INTER-DOMAIN SEGMENT ROUTING

(71) Applicant: Juniper Networks, Inc., Sunnyvale, CA (US)

(72) Inventors: Yimin Shen, Shrewsbury, MA (US); Wai Tong Louis Chan, Hong Kong (CN); Krzysztof Grzegorz Szarkowicz, Vienna (AT); John E. Drake, Pittsburgh, PA (US)

(73) Assignee: Juniper Networks, Inc., Sunnyvale, CA (US)

( * ) Notice: Subject to any disclaimer, the term of this patent is extended or adjusted under 35 U.S.C. 154(b) by 144 days.

(21) Appl. No.: 16/762,092

(22) PCT Filed: Mar. 31, 2020

(86) PCT No.: PCT/CN2020/082527
§ 371 (c)(1),
(2) Date: May 6, 2020

(87) PCT Pub. No.: WO2021/195992
PCT Pub. Date: Oct. 7, 2021

(65) Prior Publication Data
US 2022/0045933 A1  Feb. 10, 2022

(51) Int. Cl.
*G06F 11/00* (2006.01)
*H04L 45/02* (2022.01)
*H04L 12/46* (2006.01)

(52) U.S. Cl.
CPC .......... *H04L 45/04* (2013.01); *H04L 12/4633* (2013.01); *H04L 45/02* (2013.01)

(58) Field of Classification Search
CPC ...... H04L 45/04; H04L 12/4633; H04L 45/02
(Continued)

(56) References Cited

U.S. PATENT DOCUMENTS 10,574,562 B1  2/2020 Morris
2014/0269421 A1*  9/2014 Previdi .................. H04L 41/12
370/254
(Continued)

FOREIGN PATENT DOCUMENTS

CN  107819682 A  3/2018

OTHER PUBLICATIONS

Filsfils et al. "Segment Routing Architecture" Internet Engineering Task Force (IETF), RFC 8402, Jul. 2018, 32 pp.
(Continued)

*Primary Examiner* — Chuong T Ho
(74) *Attorney, Agent, or Firm* — Shumaker & Sieffert, P.A.

(57) ABSTRACT

Techniques are described for inter-domain segment routing using transport endpoint segments. A transport endpoint segment provisioned on a router within a domain represents any intra-domain tunnel originated at the router and having reachability to an indicated endpoint within the same domain. The provisioning router advertises a transport endpoint segment identifier (TESID) for the transport endpoint segment to other routers or a controller for use in segment routing. The TESID for the transport endpoint segment remains constant regardless of which intra-domain tunnel is bound to the transport endpoint segment. The provisioning router dynamically binds the transport endpoint segment to at least one intra-domain tunnel, and any changes to the bound intra-domain tunnel are updated locally at the provisioning router. In this way, an inter-domain segment routing tunnel may be constructed as a list TESIDs that are not affected by intra-domain tunnel changes.

19 Claims, 5 Drawing Sheets

(58) Field of Classification Search
USPC .................................. 370/252, 253, 254, 255
See application file for complete search history.

(56) References Cited

U.S. PATENT DOCUMENTS

| | | | |
|---|---|---|---|
| 2015/0271067 A1* | 9/2015 | Li .................... | H04L 45/745 |
| | | | 370/392 |
| 2017/0346718 A1 | 11/2017 | Psenak et al. | |
| 2018/0034728 A1 | 2/2018 | Filsfils et al. | |
| 2018/0077050 A1 | 3/2018 | Tiruveedhula et al. | |
| 2019/0020735 A1* | 1/2019 | Joo .................... | G06K 9/00664 |
| 2019/0068403 A1* | 2/2019 | Lee .................... | H04L 12/4641 |
| 2019/0190818 A1* | 6/2019 | Ceccarelli ............... | H04L 45/52 |
| 2020/0099611 A1 | 3/2020 | Filsfils et al. | |
| 2020/0127913 A1* | 4/2020 | Filsfils .................... | H04L 45/50 |
| 2021/0058260 A1* | 2/2021 | Xia .......................... | H04L 12/18 |
| 2021/0083975 A1* | 3/2021 | Chunduri ................. | H04L 45/34 |
| 2021/0111991 A1* | 4/2021 | Vadera .................... | H04L 45/22 |
| 2021/0226882 A1* | 7/2021 | Chen ....................... | H04L 45/28 |
| 2021/0266272 A1* | 8/2021 | Dutta .................... | H04L 45/507 |

OTHER PUBLICATIONS

Filsfils et al. "Segment Routing Use Cases" draft-filsfils-spring-segment-routing-use-cases-01, Network Working Group, Internet-Draft, Oct. 21, 2014, 35 pp.

Filsfils et al. "Segment Routing Policy Architecture" draft-ietf-spring-segment-routing-policy-06.txt, Spring Working Group, Internet-Draft, Dec. 14, 2019, 35 pp.

Previdi et al., "Source Packet Routing in Networking (SPRING) Problem Statement and Requirements," RFC 7855, Internet Engineering Task Force (IETF), May 2016, 19 pp.

Bashandy et al. "Segment Routing with the MPLS Data Plane" RFC 8660, Internet Engineering Task Force (IETF), Dec. 2019, 29 pp.

Gredler et al. "North-Bound Distribution of Link-State and Traffic Engineering (TE) Information Using BGP" RFC 7752, Internet Engineering Task Force (IETF), Mar. 2016, 48 pp.

Moy "OSPF Version 2" RFC 2328, Network Working Group, Apr. 1998, 244 pp.

Coltun et al., "OSPF for IPv6," RFC 5340, Network Working Group, Jul. 2008, 94 pp.

Sheth et al., "OSPF Hybrid Broadcast and Point-to-Multipoint Interface Type," RFC 6845, Internet Engineering Task Force, IETF, Jan. 2013, 9 pp.

Lindem et al. "OSPFv3 Link State Advertisement (LSA) Extensibility" RFC 8362, Internet Engineering Task Force (IETF), Apr. 2018, 33 pp.

Oran, "OSI IS-IS Intra-domain Routing Protocol," RFC 1142, Network Working Group, Feb. 1990, 157 pp.

Li et al. "IS-IS Extensions for Traffic Engineering" Network Working Group, RFC 5305, Oct. 2008, 15 pgs.

Vasseur et al., "Path Computation Element (PCE) Communication Protocol (PCEP)," RFC 5440, Network Working Group, Mar. 2009, 76 pp.

Enns et al., "Network Configuration Protocol (NETCONF)," RFC 6241, Internet Engineering Task Force, IETF, Jun. 2011, 113 pp.

Written Opinion and International Search Report of the International Searching Authority dated Dec. 28, 2020 in counterpart International Application No. PCT/CN2020/082527, 9 pp.

Chan et al., "Inter-Domain Traffic Steering with BGP Labeled Colored Unicast (BGP-LCU)," draft-szarecki-idr-bgp-lcu-traffic-steering-00, IDR Working Group, Jul. 7, 2019, 15 pp.

Extended European Search Report dated Dec. 22, 2020 received in counterpart EP Application No. 20188469.9, 14 pp.

Response to Extended Search Report dated Dec. 22, 2020, from counterpart European Application No. 20188469.9 filed Apr. 6, 2022, 34 pp.

\* cited by examiner

TRANSPORT ENDPOINT SEGMENTS FOR INTER-DOMAIN SEGMENT ROUTING

This application claims the benefit of U.S. International Application Serial Number PCT/CN2020/082527, filed 31 Mar. 2020 and entitled TRANSPORT ENDPOINT SEGMENTS FOR INTER-DOMAIN SEGMENT ROUTING, the entire contents of which is hereby incorporated by reference.

TECHNICAL FIELD

The disclosure relates to computer networks and, more particularly, to engineering traffic flows within computer networks.

BACKGROUND

A computer network is a collection of interconnected computing devices that exchange data and share resources. In a packet-based network, such as the Internet, computing devices communicate data by dividing the data into small blocks called packets, which are individually routed across the network from a source device to a destination device. The destination device extracts the data from the packets and assembles the data into its original form. Certain devices (i.e., nodes) within the network, referred to as routers, use routing protocols to exchange and accumulate topology information that describes the network. This allows a router to construct its own routing topology map of the network. Upon receiving an incoming data packet, the router examines keying information within the packet and forwards the packet in accordance with the accumulated topology information.

Many routing protocols fall within a protocol class referred to as Interior Gateway Protocol (IGP) in which flooding-based distribution mechanisms are used to announce topology information to routers within the network. These routing protocols typically rely on routing algorithms that require each of the routers to have synchronized routing topology information for a given domain, referred to as the IGP area or domain.

Packet-based networks increasingly utilize label switching protocols for traffic engineering and other purposes. Multi-Protocol Label Switching (MPLS) is a mechanism used to engineer traffic patterns within Internet Protocol (IP) networks according to the routing information maintained by the routers in the networks. By utilizing MPLS protocols, label switching routers can forward traffic along a particular path through a network to a destination device, i.e., a Label Switched Path (LSP), using labels prepended to the traffic. An LSP defines a distinct path through the network to carry MPLS packets from the source device to a destination device. Routers may employ segment routing techniques, such as by using a Source Packet Routing in Networking (SPRING) paradigm, to advertise network segments between nodes using an IGP and build single or multi-hop tunnels within an IGP domain. To perform segment routing, an ingress router adds one or more labels in a label stack, e.g., a segment list, to a packet, and intermediate routers along the path remove labels from the label stack applied to the packet as the packet is forwarded through the network.

SUMMARY

In general, this disclosure describes techniques for inter-domain segment routing using transport endpoint segments. A transport endpoint segment is a new segment type that represents an abstract transport service to an endpoint. For example, a transport endpoint segment provisioned on a router within a domain represents any intra-domain tunnel originated at the router and having reachability to an indicated endpoint within the same domain. The provisioning router allocates a transport endpoint segment identifier (TESID) for the transport endpoint segment and advertises the TESID to other routers or a controller for use in segment routing. The TESID for the transport endpoint segment remains constant regardless of which intra-domain tunnel is currently bound to the transport endpoint segment.

Traditionally, an inter-domain segment routing tunnel is constructed as a list of binding segment identifiers (BSIDs) of intra-domain tunnels. Whenever there is a change to any one of the intra-domain tunnels, however, the BSID list for the inter-domain tunnel becomes invalid and needs to be updated at the ingress router. The traditional technique results in control plane churn at the ingress router, a controller, and/or other border routers, despite there being no end-to-end path change to the inter-domain tunnel.

According to the disclosed techniques, an inter-domain segment routing tunnel is constructed as a list TESIDs of transport services that are not affected by intra-domain tunnel changes. The provisioning router dynamically binds the transport endpoint segment to at least one intra-domain tunnel with reachability to the indicated endpoint. The transport endpoint segment thus inherits the forwarding state for the bound intra-domain tunnel at the provisioning router. Any changes to the bound intra-domain tunnel and the associated forwarding state are updated locally at the provisioning router, without needing to advertise the changes to the other routers or the controller or update the TESID list for the inter-domain segment routing tunnel at the ingress router.

In one example, this disclosure is directed to a method comprising provisioning, by a first router included in a first domain of a network, a transport endpoint segment that represents any intra-domain tunnel originated at the first router and having reachability to a second router included in the first domain; advertising, by the first router, a TESID allocated for the transport endpoint segment; binding, by the first router, the transport endpoint segment to a first intra-domain tunnel originated at the first router and having reachability to the second router; upon receipt of packets including the TESID for the transport endpoint segment, forwarding the packets from the first router and toward the second router in accordance with the first intra-domain tunnel; updating, by the first router, the binding of the transport endpoint segment to a second intra-domain tunnel originated at the first router and having reachability to the second router; and after the update, upon receipt of packets including the same TESID for the transport endpoint segment, forwarding the packets from the first router and toward the second router in accordance with the second intra-domain tunnel.

In another example, this disclosure is directed to a first router included in a first domain of a network, the first router comprising: one or more interfaces; and a control unit in communication with the one or more interfaces. The control unit comprises one or more processors configured to provision a transport endpoint segment that represents any intra-domain tunnel originated at the first router and having reachability to a second router included in the first domain; advertise a TESID allocated for the transport endpoint segment; bind the transport endpoint segment to a first intra-domain tunnel originated at the first router and having reachability to the second router; upon receipt of packets including the TESID for the transport endpoint segment, forward the packets from the first router and toward the second router in accordance with the first intra-domain tunnel; update the binding of the transport endpoint segment to a second intra-domain tunnel originated at the first router and having reachability to the second router; and after the update, upon receipt of packets including the same TESID for the transport endpoint segment, forward the packets from the first router and toward the second router in accordance with the second intra-domain tunnel.

In a further example, this disclosure is directed to a system comprising: a first border router included in a first domain and a second domain of a network, the first border router configured to advertise a TESID allocated for a transport endpoint segment that represents any intra-domain tunnel originated at the first border router and having reachability to a second border router included in the first domain; and an ingress router included in the second domain of the network. The ingress router is configured to: store an inter-domain segment routing tunnel as a list of SIDS that at least includes the TESID for the transport endpoint segment to the second border router; and forward packets destined for an egress router of the inter-domain segment routing tunnel in accordance with a segment routing label stack for the inter-domain segment routing tunnel that at least includes the TESID for the transport endpoint segment to the second border router. The first border router is further configured to, upon receipt of the packets having the segment routing label stack including the TESID for the transport endpoint segment to the second border router, forward the packets from the first border router and toward the second border router in accordance with whichever intra-domain tunnel is currently bound to the transport endpoint segment.

The details of one or more examples are set forth in the accompanying drawings and the description below. Other features, objects, and advantages will be apparent from the description, drawings, and from the claims.

DETAILED DESCRIPTION

Figure 1:
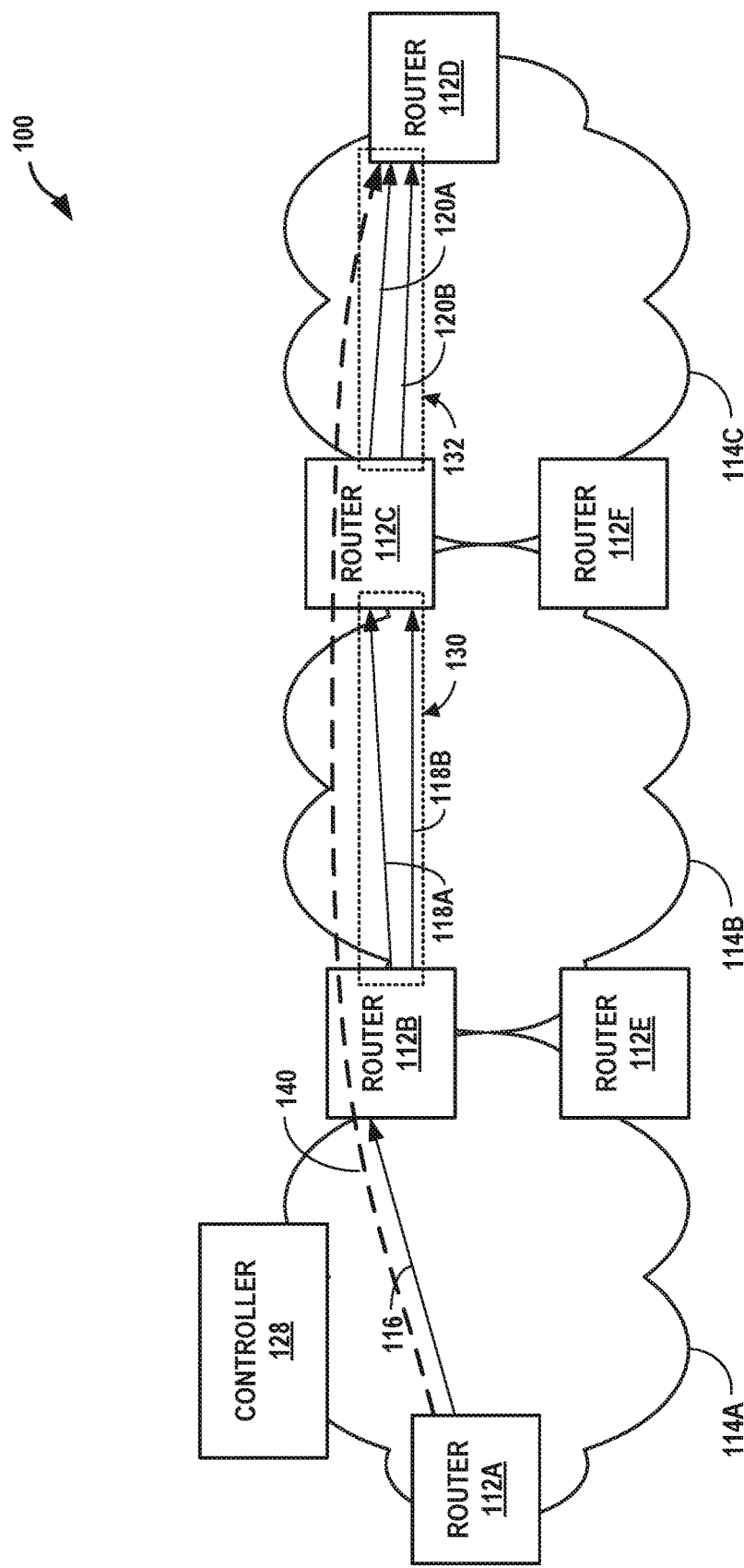
FIG. 1 is a block diagram illustrating an example network that supports use of transport endpoint segments for inter-domain segment routing, in accordance with techniques of this disclosure.

FIG. 1 is a block diagram illustrating an example network 100 that supports use of transport endpoint segments for inter-domain segment routing, in accordance with techniques described in this disclosure. Segment routing, which may also be referred to as source packet routing or source packet routing in networking (SPRING), is a control-plane architecture that enables an ingress router to steer a packet through a specific set of nodes and links in a network without relying on intermediate nodes in the network to determine the path it should take.

In the example of FIG. 1, network 100 includes multiple routing areas or domains 114A-114C (collectively, "domains 114") and routers 112A-112F (collectively, "routers 112"). In some examples, domains 114 may each comprise an Interior Gateway Protocol (IGP) area or domain that includes a set of routers under common administrative control and that share a common routing protocol. Example IGPs include Intermediate System-Intermediate System (IS-IS) and Open Shortest Path First (OSPF). In the illustrated example of FIG. 1, routers 112 comprise border routers at the edge and between the different domains. Although not shown in FIG. 1, each of domains 114 include one or more other network devices that operate as transit routers or switches to forward traffic within the respective domains and between border routers 112.

As illustrated in FIG. 1, domain 114A also includes a controller device 128, which may operate as a software defined networking (SDN) controller or other centralized controller that provides control plane operations and management for routers and other network devices within one or more of domains 114A-114C. For purposes of explanation, controller device 128 is described herein as providing control plane operations and management for at least domain 114A and domain 114B. In other examples, each of domain 114B and domain 114C may include a designated, centralized controller.

As illustrated, router 112A serves as an ingress router of inter-domain segment routing tunnel 140, and hence, may be referred to in this disclosure as ingress router 112A. The sources of the network traffic received by ingress router 112A may comprise one or more devices (not shown) and/or any public or private network or the Internet that provides traffic to ingress router 112A in network 100. Furthermore, in some examples, router 112D serves as an egress router of inter-domain segment routing tunnel 140, and hence, may be referred to in this disclosure as egress router 112D. The destinations of the network traffic being forwarded on inter-domain tunnel 140 may comprise one or more destination devices (not shown) and/or networks that may include LANs or wide area networks (WANs) that comprise a plurality of devices. For example, destination devices may include personal computers, laptops, workstations, personal digital assistants (PDAs), wireless devices, network-ready appliances, file servers, print servers or other devices that access the source via network 100.

In the example of FIG. 1, routers 112 may use segment routing techniques, e.g., a SPRING paradigm, to advertise segments between nodes using an IGP or border gateway protocol (BGP) and build single or multi-hop tunnels within each domain 114. Segment routing may engage IGPs or BGP for advertising multiple types of segments. A first example type of segment is an "adjacency segment" that represents a strict-forwarded, typically single-hop tunnel that carries packets over a specific link between a router and a specific node, irrespective of the link cost. A second example type of segment is a "prefix segment" that represents a typically multi-hop tunnel using least cost path links between a router and to a specific address prefix. A third example type of segment is a "binding segment" that represents a specific intra-domain tunnel between a router and a specific node or a specific address prefix. This disclosure presents a new type of segment referred to as a "transport endpoint segment" that represents an abstract transport service to a specific node. Unlike a binding segment that represents a specific intra-domain tunnel, the transport endpoint segment described herein represents any intra-domain tunnel between a router and the specific node.

In segment routing, the "path" information for segments is disseminated between the routers within each of domains 114 as part of the IGP link state information for the respective domain. In accordance with this disclosure, the path information for at least transport endpoint segments is disseminated or advertised between border routers 112 using a border gateway protocol (BGP) and/or to controller device 128 using a BGP link state (BGP-LS). Ingress router 112A is able to steer a packet through an ordered list of instructions or segments by prepending one or more segment identifiers (SIDs) to the packet. In other words, ingress router 112A can steer a packet through a desired set of nodes and links by prepending the packet with an appropriate combination (stack) of SIDs. Segment routing allows routers to enforce a flow through any topological path and service chain while maintaining per-flow state only at the ingress node to each domain.

Segment routing can be directly applied to the Multiprotocol Label Switching (MPLS) architecture with no change in the forwarding plane. A network administrator or centralized controller, e.g., controller device 128, need only allocate SIDs to particular routers and the segment routing control plane architecture automatically builds the required MPLS forwarding constructs from a router to any other router. A SID is encoded as an MPLS label, and an ordered list of SIDs is encoded as a stack of labels. The SID of the segment to be processed is on the top of the stack and, upon completion of a segment, the related label is popped from the stack as the packet is forwarded through the network.

Segment routing is further described in Filsfils, et al., "Segment Routing Architecture," IETF RFC 8402, July 2018, while Segment Routing use cases are described in Filsfils, et al., "Segment Routing Use Cases," IETF Internet-Draft draft-filsfils-spring-segment-routing-use-cases-01, Oct. 21, 2014, each of which is incorporated herein by reference. Further details regarding SPRING are found in (1) Filsfils, et al., "Segment Routing Policy Architecture," IETF Internet-Draft draft-ietf-spring-segment-routing-policy-06, Dec. 14, 2019; (2) Previdi, et al., "Source Packet Routing in Networking (SPRING) Problem Statement and Requirements," IETF RFC 7855, May 2016; and (3) Bashandy, et al., "Segment Routing with MPLS data plane," IETF RFC 8660, December 2019, each of which is incorporated herein by reference.

Further description of the establishment and use of prefix segments in network 100 is provided as an illustrative example. Each of routers 112 may be associated with an address prefix. For instance, an administrator or controller device 128 may assign prefixes to one or more of routers 112. A prefix may be an address or block of addresses. The prefix corresponding to a node (e.g., a router) may comprise an Internet Protocol (IP) address (e.g., IPv4 or IPv6), a block of IP addresses, or another type of data identifying the node. Additionally, one or more of routers 112 may be configured with a segment identifier (SID) associated with the prefix. A router in network 100 may advertise its prefix and SID to neighboring routers within the same one of domains 114 of network 100. When a router receives an advertisement, the router may forward the advertisement to its neighboring routers. A router that merely forwards an advertisement is not considered to originate the advertisement. Additionally, when a router receives an advertisement, the router determines whether the prefix specified in the advertisement is already associated with the SID specified in the advertisement. If this is the case and if the advertisement represents a new best path, the router may update a routing table in response to the advertisement such that the routing table indicates a next hop in the route to the prefix. If the advertisement represents an equal cost compared to the existing route, the router may add an equal-cost multi-path (ECMP) next hop to the existing route.

If the advertisement specifies a prefix and a SID that are not already in the receiving router's link state database (LSDB) or traffic engineering database (TED), the router may calculate a route to the prefix specified in the advertisement. In some examples, the router may calculate the route according to a shortest path algorithm or a strict shortest path algorithm. Furthermore, in some examples, an advertisement may specify the type of algorithm to use to calculate the route to the prefix specified in the advertisement. Additionally, the router may associate the SID specified by the advertisement with the calculated route to the prefix specified by the advertisement. In other words, the router may generate data that associates the SID with the route. The router may then install the route as an active route. Installing a route as an active route may comprise generating forwarding information that a forwarding component of the router may use to forward packets to next hops of routes associated with SIDs attached to the packets. For instance, installing the route as an active route may comprise generating information in a forwarding table that maps a SID to an interface card attached to a link to a next hop of the route associated with the SID.

As illustrated in FIG. 1, a network, such as network 100, may be partitioned into multiple IGP domains or areas 114. For instance, network 100 includes three domains 114A, 114B, and 114C. In the example of FIG. 1, border routers 112A, 112B, and 112E are in domain 114A, border routers 112B, 112C, 112E, and 112F are in domain 114B, and border routers 112C, 112D, and 112F are in domain 114C. Routers 112B and 112E are in both domain 114A and domain 114B, and routers 112C and 112F are in both domain 114B and domain 114C. Nodes in a given domain typically do not store data describing nodes and routes within other domains, including prefixes and SIDs. For instance, a router in a first IGP domain does not typically store a LSDB or TED and corresponding prefixes and SIDs for any other IGP domain.

When an IGP advertisement originated by a router in domain 114A reaches a border router that spans the domain 114A and second domain 114B, e.g., router 112B or 112E, the router spanning the domains may either drop the advertisement originated in domain 114A or re-originate the advertisement in domain 114B. For instance, in the example of FIG. 1, if router 112B receives an IGP advertisement originated by router 112A in domain 114A, router 112B may not forward the advertisement to router 112C in domain 114B.

After installing a route as an active route, a router may receive a packet. In response to receiving the packet, the router may determine whether a stack of one or more labels is attached to the packet. The stack of labels comprises an ordered sequence of labels. If there is no stack of labels attached to the packet when the router receives the packet or if there are no remaining labels attached to the packet after the router removes the active label, the router forwards the packet to another node in network 100 without further use of segment routing. For instance, the router may forward the packet according to an IP address of the packet.

However, if the stack of labels still includes one or more labels, the router may determine a next hop of a route associated with the active label of the stack. The active label may be the label at the "top" of the stack. For instance, the active label may be the label occurring first in an ordered sequence of labels attached to the packet. If the next hop of the route associated with the active label advertised the active SID, the router may remove the active label from the stack of labels attached to the packet, potentially leaving one or more labels remaining attached to the packet. In other words, the router may "pop" the active label from the stack. The router may then forward the packet, along with the remaining labels of the stack, to a next hop on the route associated with the active label. This system may allow a source node, such as ingress router 112A, to control the path a packet takes through network 100.

Ingress routers of each one of domains 114 may build intra-domain LSPs, e.g., using label distribution protocol (LDP) or resource reservation protocol with traffic engineering extensions (RSVP-TE), or intra-domain segment routing (SR) tunnels within the respective domain. The ingress routers may then provision binding segments that represent the intra-domain tunnels and assign binding SIDs (BSIDs) to the binding segments. Traditionally, an inter-domain segment routing tunnel is constructed by using a list of BSIDs of intra-domain tunnels, essentially stitching together a sequence of intra-domain tunnels. For example, an inter-domain segment routing tunnel across N domains may be achieved by using a BSID list comprising SID_1, SID_2, . . . , SID_N, where SID_X is the BSID of an intra-domain tunnel across domain X.

One issue with this approach is that, whenever there is a change to an intra-domain tunnel at a border router, the above BSID list would become invalid and have to be updated. This may happen when the intra-domain tunnel goes down, is demoted or de-configured, or experiences another type of state change. In this case, the border router (i.e., head-end) switches to a different intra-domain tunnel having a different BSID, and, therefore, the inter-domain segment routing tunnel also needs to switch to use the different intra-domain tunnel. This leads to two scenarios of control plane actions, depending on the provisioning model of the inter-domain segment routing tunnel. If the inter-domain segment routing tunnel is provisioned by a controller, the controller must learn the change event of the intra-domain tunnel, associate the inter-domain tunnel to the different intra-domain tunnel, build a new BSID list, and re-program the ingress router with the new BSID list. If the inter-domain segment routing tunnel is provisioned by BGP signaling, the border router (i.e. head-end) of the changed intra-domain tunnel must send a BGP UPDATE upstream, triggering cascading BGP UPDATEs towards the ingress router. In both cases, there would be control plane churns, despite there being no end-to-end path change to the inter-domain segment routing tunnel. Hence, these control plane churns are considered unnecessary and undesirable for the network.

The techniques described in this disclosure, introduce a new type of segment, referred to as a "transport endpoint segment," to solve the above described issue. A transport endpoint segment is a notion representing an abstract transport service to an endpoint (e.g., a border router). The transport endpoint segment may be defined by at least one mandatory attribute of an endpoint address (e.g., IPv4 or IPv6), and one or more optional attributes, such as a color attribute, traffic engineering (TE) attributes, and the like. The transport endpoint segment may be associated with a set of intra-domain tunnels (e.g., LDP or RSVP LSPs or SR tunnels) that are qualified for the indicated attributes. The qualified set of intra-domain tunnels for the transport endpoint segment comprise any intra-domain tunnels that at least have reachability to the indicated endpoint address. The transport endpoint segment may be dynamically bound to a single tunnel, or in some cases multiple tunnels in an ECMP or weighted ECMP (WECMP) manner. The transport endpoint segment then inherits the forwarding state (i.e. nexthop) from the bound tunnel or tunnels. The transport endpoint segment is an entity at the level above BSID, hiding the detail of the bound intra-domain tunnel. As such, a transport endpoint SID (TESID) allocated for the transport endpoint segment remains constant across changes to the bound intra-domain tunnel.

In a controller-based inter-domain segment routing (SR) provisioning model, the controller programs the ingress router with a list of transport endpoint SIDs bound to the intra-domain tunnels used to create the inter-domain tunnel. When an inter-domain tunnel is constructed by using the list of transport endpoint SIDs, the forwarding state (i.e. nexthop) change of any transport endpoint SID is completely local on the border router and is hidden from the controller and ingress router. In the controller-based inter-domain SR provisioning model, there is no need for the controller to re-program the ingress router with a new segment list when changes occur to one or more of the intra-domain tunnels. In the BGP-signaling based inter-domain SR provisioning model, BGP accumulates a list of transport endpoint SIDs from the egress router to the ingress router to be used by the ingress router. In the BGP-signaling based inter-domain SR provisioning model, there are no cascading BGP UPDATE messages from the border router towards the ingress router when changes occur to one or more of the intra-domain tunnels. Hence, in accordance with the disclosed techniques, the control plane churns may be avoided almost completely.

A transport endpoint segment may be provisioned statically or dynamically. When provisioned statically, a transport endpoint segment is created and deleted by configuration, becomes active when there is at least one qualified intra-domain tunnel to bind to, and becomes inactive when there is no qualified intra-domain tunnel to which to bind. When provisioned dynamically, a transport endpoint segment is created when the first qualified intra-domain tunnel comes to exist, and deleted when the last qualified intra-domain tunnel is gone. In the controller-based inter-domain SR provisioning model, border routers distribute transport endpoint SIDs to controller via BGP LS, as logic links.

Referring to FIG. 1, as one example, suppose ingress router 112A is configured to send a packet to egress router 112D via a route through router 112B and router 112C. Furthermore, in this example, let router 112B be assigned a SID "100," let an intra-domain tunnel 118A from router 112B to router 112C be assigned a BSID "200," and let an intra-domain tunnel 120A from router 112C to router 112D be assigned a BSID "800." Traditionally, ingress router 112A may send the packet via an inter-domain segment routing tunnel to egress router 112D using a list of BSIDs of the intra-domain tunnels. For example, ingress router 112A may push a stack of labels: "100," "200," "800," onto the packet and send the packet to a next hop on the route associated with the label "100" (i.e., router 112B). A penultimate hop to router 112B removes the label "100." Upon receipt of the packet, router 112B then removes the label "200" and forwards the packet to router 112C via the intra-domain tunnel associated with the label "200" (i.e., intra-domain tunnel 118A). Router 112C then removes the label "800" and forwards the packet to router 112D via the intra-domain tunnel associated with the label "800" (i.e., intra-domain tunnel 120A).

If intra-domain tunnel 118A experiences any state change (e.g., goes down or is deconfigured or demoted), border router 112B switches to a different intra-domain tunnel 118B between router 112B and router 112C that is assigned a BSID "300." When using the traditional techniques for constructing an inter-domain segment routing tunnel, the BSID list for the inter-domain segment routing tunnel programmed at ingress router 112A must be updated to reflect the change in the intra-domain tunnel from 118A to 118B (i.e., updating BSID "200" to BSID "300" in the BSID list for the inter-domain segment routing tunnel), although the end-to-end path for the inter-domain segment routing tunnel from ingress router 112A to egress router 112D remains unchanged. Similar updates would occur if intra-domain tunnel 120A experienced changes that resulted in a switch to intra-domain tunnel 120B between router 112C and router 112D.

In accordance with the techniques of this disclosure, instead of using a list of BSIDs of the intra-domain tunnels to create the inter-domain segment routing tunnel from ingress router 112A to egress router 112D, which cause control plane churn at border routers e.g., 112B and 112C) due to intra-domain changes, routers 112 are configured to support transport endpoint segments for inter-domain segment routing tunnels.

Referring to FIG. 1, as one example, let router 112B be assigned a SID "100," let a transport endpoint segment 130 originated at router 112B with reachability to router 112C be assigned a transport endpoint SID (TESID) "2000," and let a transport endpoint segment 132 originated at router 112O with reachability to router 112D be assigned a TESID "1000." Transport endpoint segment 130 is bound to one or more of intra-domain tunnels 118A, 118B to router 112C. Similarly, transport endpoint segment 132 is bound to one or more of intra-domain tunnels 120A, 120B to router 112D.

Router 112B advertises the TESID for transport endpoint segment 130 to other border routers in domain 114A and domain 114B (including ingress router 112A) using BGP and/or to controller device 128 using BGP-LS. Similarly, router 112C advertises the TESID for transport endpoint segment 132 to other border routers in domain 114B and domain 114C and/or to controller device 128. In the example of FIG. 1, border router 112B and/or border router 112E would forward the TESID advertisement received from router 112C toward ingress router 112A.

Ingress router 112A or controller device 128 then provisions an inter-domain segment routing tunnel 140 as a list of SIDs, including the TESIDs received from border routers 112B and 112C. Ingress router 112A stores the list of SIDs for the inter-domain tunnel 140 and uses the list of SIDs to construct a segment routing label stack for forwarding packets on inter-domain tunnel 140. In accordance with the techniques described herein, the TESIDs for transport endpoint segments 130 and 132 remain constant regardless of which intra-domain tunnels are currently bound to the transport endpoint segments. Therefore, the list of SIDs and associated segment routing label stack for inter-domain segment routing tunnel 140 also remain constant across changes to the bound intra-domain tunnels.

Ingress router 112A may send a packet via inter-domain segment routing tunnel 140 to egress router 112D using the segment routing label stack for inter-domain tunnel 140. For example, ingress router 112A may push a stack of labels: "100," "2000," "1000," onto the packet and send the packet to a next hop on the route associated with the label "100" (i.e., router 112B). A penultimate hop to router 112B removes the label "100." Upon receipt of the packet, router 112B then removes the label "2000" and forwards the packet toward router 112C via whichever of intra-domain tunnels 118A, 118B is currently bound to transport endpoint segment 130 associated with label "2000." Router 112C then removes the label "1000" and forwards the packet toward router 112D via whichever of intra-domain tunnels 120A, 120B is currently bound to transport endpoint segment 132 associated with label "1000."

If intra-domain tunnel 118A experiences any state change (e.g., goes down or is deconfigured or demoted), border router 112B performs the necessary forwarding state changes to switch from intra-domain tunnel 118A to intra-domain tunnel 118B, but no updates need to be sent to ingress router 112A and/or controller device 128. In this way, the use of transport endpoint segments reduces, and in some cases eliminates, control plane churn to maintain an inter-domain segment routing tunnel due to intra-domain tunnel changes as any changes are performed on the local border router (e.g., 112B or 112C) but are hidden from ingress router 112A and controller device 128.

Figure 2:
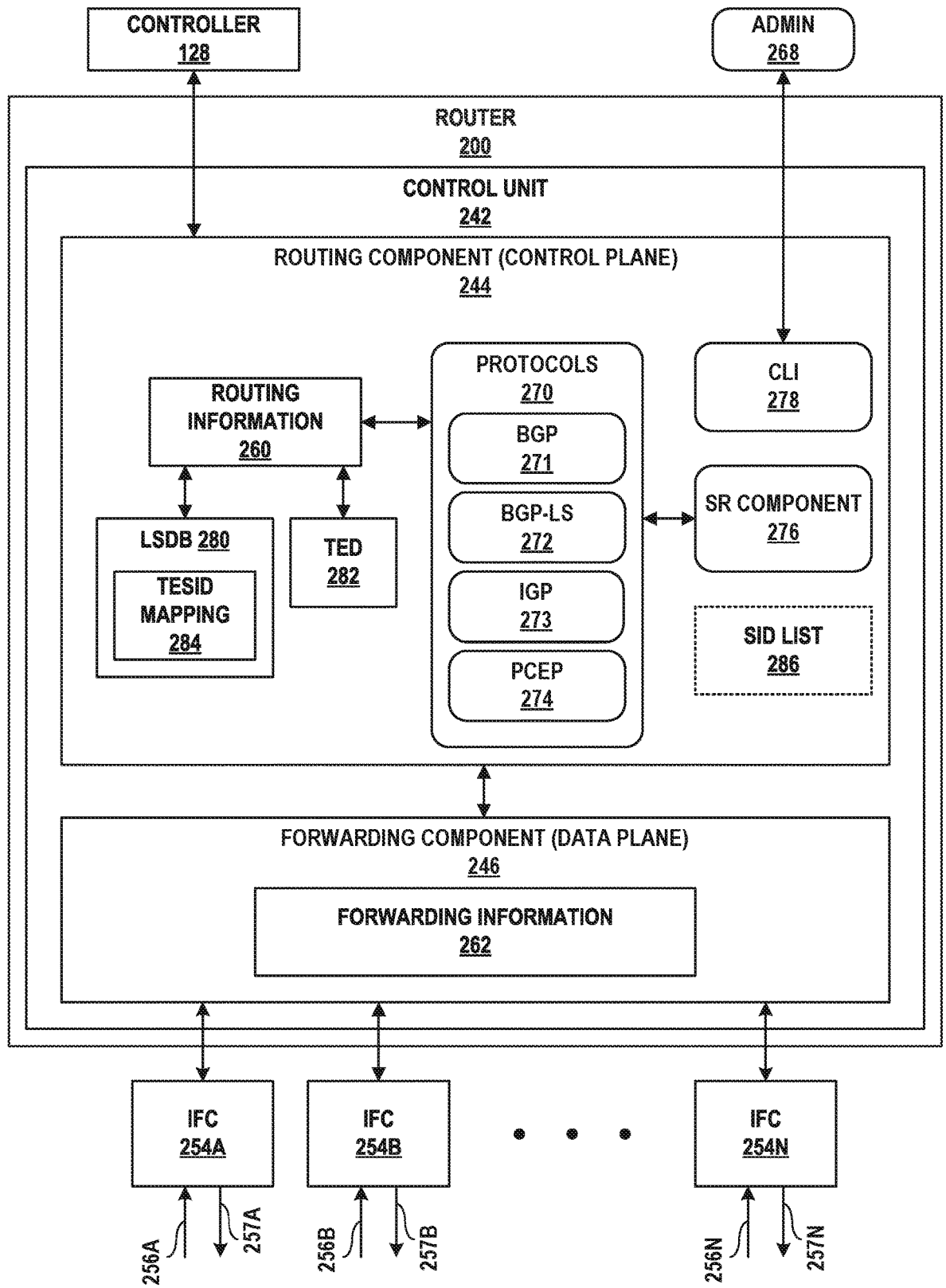
FIG. 2 is a block diagram illustrating an example router capable of operating in accordance with the techniques of this disclosure.

FIG. 2 is a block diagram illustrating an example router 200 capable of operating in accordance with the techniques described herein. Router 200 may represent any of routers 112 of FIG. 1. While described with respect to router 200, the techniques may be implemented by any other type of network device capable of implementing segment routing. Thus, while described with respect to router 200, the techniques should not be limited to router 200 described with respect to the example of FIG. 2.

In the example of FIG. 2, router 200 includes interface cards 254A-254N ("IFCs 254") that receive and send data units, such as packet flows, via network links 256A-256N and 257A-257N, respectively. Router 200 may include a chassis (not shown) having a number of slots for receiving a set of cards, including IFCs 254. Each card may be inserted into a corresponding slot of the chassis for electrically coupling the card to routing component 244 via high-speed switch (not shown), which may comprise, for example, switch fabric, switchgear, a configurable network switch or hub, or other high-speed switching mechanisms. IFCs 254 may be coupled to network links 256A-256N and 257A-257N via a number of physical interface ports (not shown). Generally, IFCs 254 may each represent one or more network interfaces by which router 200 may interface with links of a network.

In general, router 200 may include a control unit 242 that determines routes of received packets and forwards the packets accordingly via IFCs 254. In the example of FIG. 2, control unit 242 includes routing component (control plane) 244 that configures and controls packet forwarding operations applied by forwarding component (data plane) 246.

Routing component 244 provides an operating environment for various routing protocols 270 that execute at different layers of a network stack. Routing component 244 is responsible for the maintenance of routing information 260 to reflect the current topology of a network and other network entities to which router 200 is connected. In particular, routing protocols periodically update routing information 260 to accurately reflect the topology of the network and other entities based on routing protocol messages received by router 200. The protocols may be software processes executing on one or more processors. For example, routing component 244 includes network protocols that operate at a network layer of the network stack, which are typically implemented as executable software instructions.

In the example of FIG. 2, protocols 270 may include Border Gateway Protocol (BGP) 271 to exchange routing and reachability information among routing domains in a network and BGP-LS 272 to exchange traffic engineering and segment routing policy information among routing domains in the network. The BGP-LS protocol is described in additional detail in H. Gredler, et al., "North-Bound Distribution of Link-State and Traffic Engineering (TE) Information using BGP," Internet Engineering Task Force (IETF) RFC 7752. March 2016, the entire contents of which are incorporated herein by reference.

Protocols 270 may also include IGP 273 to exchange link state information, and facilitate forwarding of packets or other data units between routers within each of the routing domains. In some examples, IGP 273 may include an OSPF routing protocol in accordance with one or more of the RFC 2328, by J. Moy, entitled "OSPF Version 2," dated April 1998, RFC 5340, by R. Coltun et al. entitled "OSPF for IPv6," dated July 2008, RFC 6845, by N. Sheth et al., entitled "OSPF Hybrid Broadcast and Point-to-Multipoint Interface Type," dated January 2013, and RFC 8362, by A. Lindem et al., entitled "OSPFv3 Link State Advertisement (LSA) Extendibility," dated April 2018. In some examples, IGP 273 may include an IS-IS routing protocol that implements an IGP for exchanging routing and reachability information within a routing domain in accordance with RFC 1142, by D. Oran, entitled "OSI IS-IS Intra-domain Routing Protocol," dated February 1990 (republication of ISO/IEC 10589, last updated November 2002). IGP 273 may include IS-IS extensions that support traffic engineering, as described in RFC 5305, by T. Li et al., entitled "IS-IS Extensions for Traffic Engineering," dated October 2008. In some examples, router 200 may include both an OSPF component and an IS-IS component.

Protocols 270 may also include configuration protocols. For example, protocols 270 may include PCEP 274 in accordance with RFC 5440, by J P. Vasseur, Ed., et al, entitled "Path Computation Element (PCE) Communication Protocol (PCEP)." dated March 2009, or NETCONF (not shown) in accordance with RFC 6241, by R. Enns, Ed., et al., entitled "Network Configuration Protocol (NETCONF)," dated June 2011. In some examples where router 200 comprises an ingress router, controller device 128 (from FIG. 1 and FIG. 3) may configure router 200 with SID list 286 for a segment routing tunnel via PCEP 274 or a NETCONF component (not shown). Protocols 270 may include other routing protocols (not shown), such as Label Distribution Protocol (LDP), Resource Reservation Protocol with Traffic Extensions (RSVP-TE), routing information protocol (RIP), or other network protocols.

Routing component 244 includes a segment routing. (SR) component 276 to implement segment routing techniques that specify how router 200 may provision and advertise SIDs for adjacency segments, prefix segments, binding segments or, in accordance with this disclosure, transport endpoint segments. As described in FIG. 1, an ingress router may use the SIDs to steer a packet through a controlled set of instructions, called segments, by prepending the packet with a SID label stack in a segment routing header.

In accordance with the described techniques, in one example, SR component 276 may dynamically provision a transport endpoint segment originated at router 200 to a specific endpoint within the same domain as router 200. SR component 276 defines the transport endpoint segment as having, at least, a mandatory endpoint address attribute that indicates the IP address of the specific endpoint. In the dynamic provisioning scenario, SR component 276 creates the transport endpoint segment in response to establishment of a first qualified intra-domain tunnel to which to bind the transport endpoint segment. The first qualified intra-domain tunnel for the transport endpoint segment is the first tunnel established between router 200 and the endpoint address identified by the mandatory endpoint address attribute of the transport endpoint segment. In a similar manner, SR component 276 deletes the transport endpoint segment in response to tear down or failure of the last qualified intra-domain tunnel to which to bind the transport endpoint segment.

In another example, SR component 276 may statically provision a transport endpoint segment originated at router 200 to a specific endpoint within the same domain as router 200. In the example of FIG. 2, routing engine 244 includes a command line interface (CLI) 278 that provides access for an administrator ("admin") 268 to monitor, configure, or otherwise manage router 200. Admin 268 may instruct router 200 via CLI 278 to statically provision the transport endpoint segment originated at router 200 to the specific endpoint. In the static provisioning scenario, SR component 276 creates the transport endpoint segment having the mandatory attribute identifying the address of the second router in response to receipt of configuration information from admin 268 via CLI 278. SR component 276 then activates the transport endpoint segment in response to the establishment of at least one qualified intra-domain tunnel to which to bind the transport endpoint segment. When there is no qualified intra-domain tunnel to which to bind the transport endpoint segment, the transport endpoint segment remains in or transitions to an inactive state. SR component 276 deletes the transport endpoint segment in response to receipt of configuration information from admin 268 via CLI 278.

Upon provisioning the transport endpoint segment, SR component 276 may allocate a TESID for the provisioned transport endpoint segment. In other examples, admin 268 may instruct router 200 via CLI 278 regarding which TESID to allocate for the provisioned transport endpoint segment. SR component 276 may then use BGP 271 or BGP-LS 272 to advertise the TESID for the provisioned transport endpoint segment as a MPLS label. As one example, SR component 276 uses BGP 271 to advertise the TESID for the transport endpoint segment in BGP messages to at least other border routers in the same domain(s) as router 200. As another example, SR component 276 may use BGP-LS 272 to advertise the TESID for the transport endpoint segment in BGP-LS messages to controller device 128 configured to manage the domain(s) of router 200. In either example, SR component 276 advertises the same TESID for the transport endpoint segment regardless of which intra-domain tunnel is bound to the transport endpoint segment.

By executing the routing protocols, routing component 244 identifies existing routes through the network and determines new routes through the network. Routing component 244 stores routing information 260 that includes, for example, known routes through the network. Forwarding component 246 stores forwarding information 262 that includes destinations of output links 257. Forwarding information 262 may be generated in accordance with routing information 260.

Routing component 244 includes a link state database (LSDB) 280 for storing domain topology information including SIDs and labels for provisioned segments, e.g., adjacency segments, prefix segments, and binding segments, within the routing domain of router 200. In accordance with this disclosure, LSDB 280 may also store the TESIDs for the provisioned transport endpoint segments originated at router 200. The contents of LSDB 280 are maintained in accordance with an IGP 273 and have the scope of a single routing domain. Routing component 244 further includes a Traffic Engineering Database (TED) 282 that augments LSDB 280 with TE link attributes. Each of LSDB 280 and TED 282 may be in the form of a variety of data structures, such as a number of tables, link lists, radix trees, databases, flat files, or other data structures.

For example, LSDB 280 may store at least one TESID for a transport endpoint segment originated at router 200 with reachability to a specific endpoint within the same domain as router 200. LSDB 280 may further store a TESID mapping table 284 that indicates the binding of the TESID to at least one qualified intra-domain tunnel between router 200 and the specific endpoint. As described above, the transport endpoint segment is defined by at least the mandatory endpoint address attribute and, in some cases, one or more optional attributes.

In one example, routing component 244 may bind the transport endpoint segment to the first qualified intra-domain tunnel that has at least the mandatory endpoint address attribute of the transport endpoint segment. In another example, routing component 244 may bind the transport endpoint segment to one or more of a plurality of qualified intra-domain tunnels that has the mandatory endpoint address attribute and has more of the optional attributes, e.g., a color attribute and/or one or more TE attributes, than the other tunnels of the plurality of qualified intra-domain tunnels. The TE attributes of links within each of the plurality of qualified intra-domain tunnels may be stored in TED 282. In some scenarios, routing component 244 may bind the transport endpoint segment to two or more of the plurality of qualified intra-domain tunnels in an equal cost multipath or a weighted equal cost multipath manner.

To bind the transport endpoint segment to a qualified intra-domain tunnel, routing component 244 records a mapping between the TESID for the transport endpoint segment and the qualified intra-domain tunnel in TESID mapping table 284. Routing component 244 then installs a route for the TESID in routing information 260 and installs a next hop for the TESID in forwarding information 262 of forwarding component 246 using forwarding state for the qualified intra-domain tunnel bound to the transport endpoint segment. In this way, upon receipt of packets including the TESID for the transport endpoint segment via IFCs 254, forwarding component 246 forwards the packets toward the specific endpoint of the transport endpoint segment in accordance with a next hop of the qualified intra-domain tunnel.

If the bound intra-domain tunnel goes down or otherwise changes state, SR component 276 may select or provision a different qualified intra-domain tunnel and routing component 244 may update the mapping recorded in TESID mapping table 284 to associate the TESID to the different qualified intra-domain tunnel. Routing component 244 then updates the route for the TESID in routing information 260 and updates the next hop for the TESID in forwarding information 262 of router 200 based on the different qualified intra-domain tunnel now bound to the same TESID for the transport endpoint segment to the specific endpoint. The updates performed by routing component 244 are completely local to router 200 and are not visible to controller 184 or the other border routers.

Because the TESID for the transport endpoint segment to the specific endpoint remains the same regardless of the underlying qualifying tunnel used to reach the specific endpoint, the local change at router 200 does not impact a SID list of an inter-domain segment routing tunnel that includes the TESID for the transport endpoint segment to the specific endpoint. In other words, after the change in the bound intra-domain tunnel, upon receipt of packets including the same TESID for the transport endpoint segment via IFCs 254, forwarding component 246 forwards the packets toward the specific endpoint of the transport endpoint segment in accordance with a next hop of the different qualified intra-domain tunnel. In this way, control unit 242 of router 200 may be configured to support use of transport endpoint SIDs to reduce control plane churn to maintain an inter-domain segment routing tunnel due to intra-domain tunnel changes.

In examples where router 200 comprises an ingress router of an inter-domain segment routing tunnel, routing component 244 may further include a SID list 286 for the inter-domain segment routing tunnel. In an example of BGP signaling-based inter-domain segment routing provisioning, routing component 244 receives TESIDs for transport endpoint segments in BGP messages from one or more border routers, and provisions the inter-domain segment routing tunnel as a list of SIDs that includes the TESIDs for transport endpoint segments along the desired path toward an egress router. In other examples, controller device 128 may provision the inter-domain segment routing tunnel and program router 200, as the ingress router, with SID list 286 for the inter-domain segment routing tunnel via PCEP 274.

Regardless of how the inter-domain segment routing tunnel is provisioned, routing component 244 stores SID list 286 for the inter-domain segment routing tunnel. Based on SID list 286, routing component 244 creates a segment routing label stack for the inter-domain segment routing tunnel. Upon receipt of packets destined for the egress router of the inter-domain segment routing tunnel, forwarding component 246 appends the segment routing stack onto the packets and forwards the packets in accordance with the segment routing label stack.

Although described for purposes of example with respect to a router, router 200 may be more generally a network device having routing functionality, and need not necessarily be a dedicated routing device. The architecture of router 200 illustrated in FIG. 2 is shown for example purposes only. The techniques of this disclosure are not limited to this architecture. In other examples, router 200 may be configured in a variety of ways. In one example, some of the functionally of control unit 242 may be distributed within IFCs 254. In another example, control unit 242 may comprise a plurality of packet forwarding engines operated as slave routers.

Control unit 242 may be implemented solely in software, or hardware, or may be implemented as a combination of software, hardware, or firmware. For example, control unit 242 may include one or more processors that execute program code in the form of software instructions. In that case, the various software components/modules of control unit 242 may comprise executable instructions stored on a computer-readable storage medium, such as computer memory or hard disk.

Figure 3:
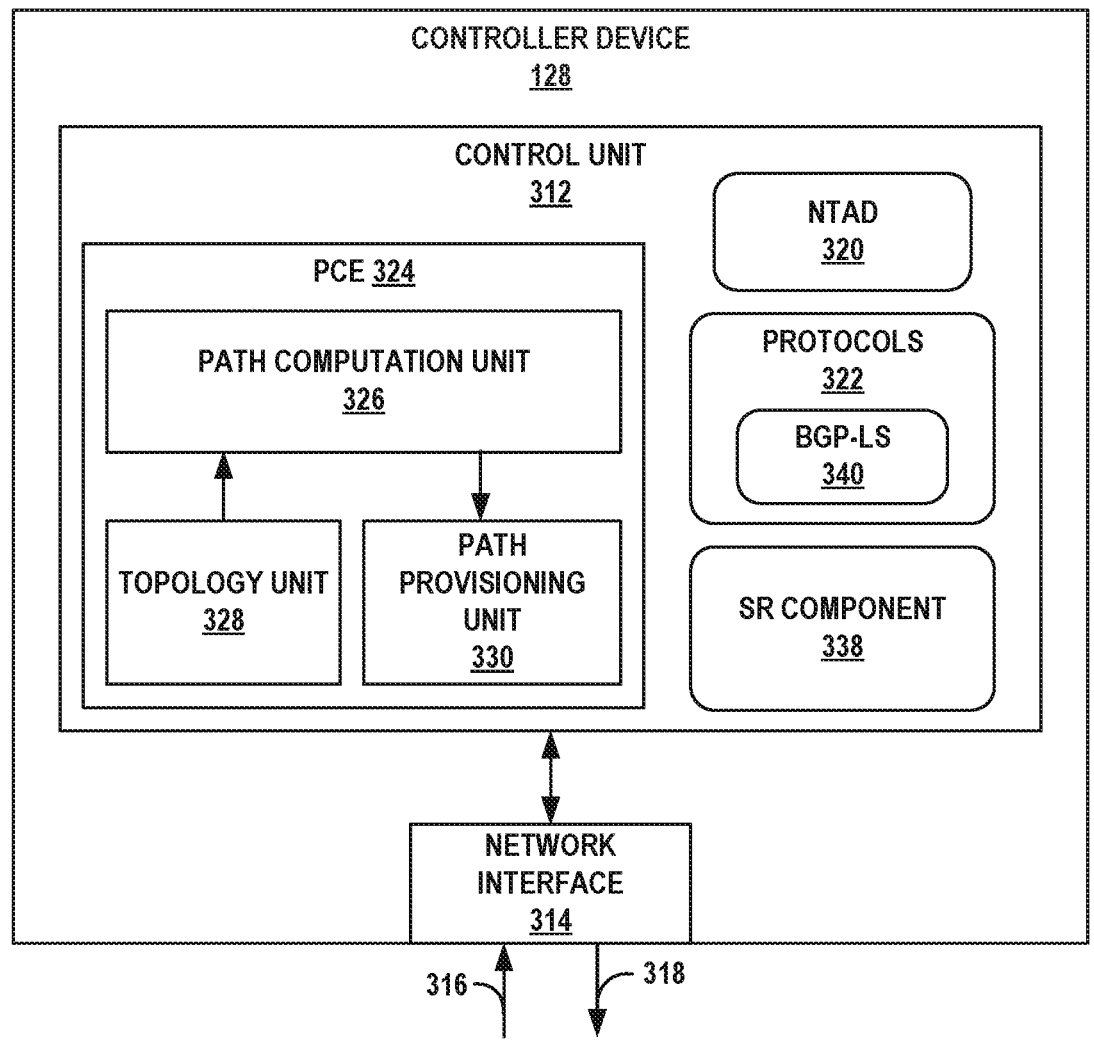
FIG. 3 is a block diagram illustrating an example controller capable of operating in accordance with the techniques of this disclosure.

FIG. 3 is a block diagram illustrating an example controller device 128 capable of operating in accordance with the techniques of this disclosure. For purposes of illustration, controller device 128 is described herein within the context of network 100 of FIG. 1. The architecture of controller device 128 illustrated in FIG. 3 is shown for example purposes only and should not be limited to this architecture. In other examples, controller device 128 may be configured in a variety of ways.

Controller device 128 includes a control unit 312 coupled to a network interface 314 to exchange packets with other network devices by inbound link 316 and outbound link 318. Control unit 312 may include one or more processors (not shown) that execute software instructions, such as those used to define a software or computer program, stored to a computer-readable storage medium (not shown). Alternatively, or additionally, control unit 312 may comprise dedicated hardware for performing the techniques described herein.

Control unit 312 provides an operating environment for network topology abstractor daemon (NTAD) 320, path computation element (PCE) 324, and segment routing (SR) component 338. In one example, these units may be implemented as one or more processes executing on one or more virtual machines of one or more servers. That is, while generally illustrated and described as executing on a single controller device 128, aspects of these units may be delegated to other computing devices. Control unit 312 also provides an operating environment for several protocols 322, including BGP-LS 340.

Control unit 312 may use BGP-LS 340 to receive link state information from border routers within one or more domains of a computer network, e.g., routers 112 in domains 114 of network 100 from FIG. 1. Control unit 312 may also forward the received link state information to NTAD 320. NTAD 320 may generate a network topology based on the received link state information.

As illustrated in FIG. 3, PCE 324 includes a path computation unit 326, a topology unit 328, and a path provisioning unit 330. NTAD 320 may forward the topology data to topology unit 328 of PCE 324. Topology unit 328 may receive the topology data describing available resources of the computer network, including access, aggregation, and edge nodes, interfaces thereof, and interconnecting communication links. Path computation unit 326 of PCE 324 may use the topology data received by topology unit 328 to compute paths across the computer network. Upon computing the paths, path computation unit 326 may schedule the paths for provisioning by path provisioning unit 330. A computed path includes path information usable by path provisioning unit 330 to establish the path in the network. For example, path provisioning unit 330 may send the path information to network devices to instruct the network devices to establish at least a portion of the path in the network. Provisioning a path may require path validation prior to committing the path to provide for packet transport.

In accordance with the disclosed techniques and in an example of controller-based inter-domain segment routing provisioning, SR component 338 uses BGP-LS 340 to receive TESIDs for transport endpoint segments in BGP-LS messages from one or more border routers. SR component 338 then uses PCE 324 to provision an inter-domain segment routing tunnel as a list of SIDs that includes the TESIDs for transport endpoint segments along the desired path from an ingress router toward an egress router. PCE 324 then programs the ingress router of the inter-domain segment routing tunnel with the list of SIDs for the inter-domain segment routing tunnel. The ingress router, e.g., router 200 from FIG. 3, then stores the SID list for the inter-domain segment routing tunnel, and creates a segment routing label stack for the inter-domain segment routing tunnel based on the SID list.

Figure 4:
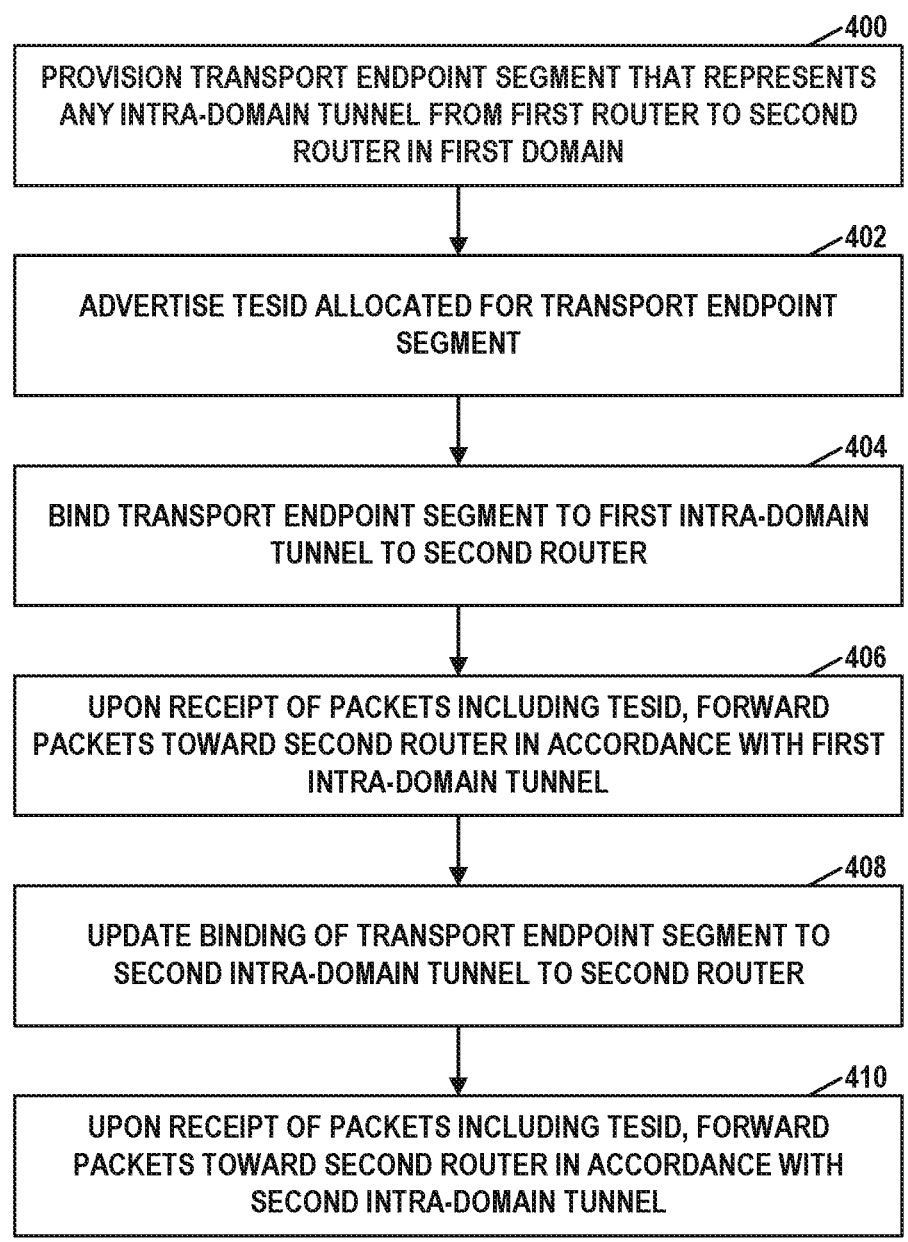
FIG. 4 is a flowchart illustrating an example operation of router provisioning a transport endpoint segment for inter-domain segment routing, in accordance with the techniques of this disclosure.

FIG. 4 is a flowchart illustrating an example operation of router provisioning a transport endpoint segment for inter-domain segment routing, in accordance with the techniques of this disclosure. The example operation is described herein with respect to router 200 of FIG. 2. Similar operations may be performed by any of border routers 112 of FIG. 1.

Router 200 included in a first domain of a network provisions a transport endpoint segment that represents any intra-domain tunnel originated at router 200 and having reachability to a second router included in the first domain (400).

As one example, router 200 may perform static provisioning of the transport endpoint segment. In this example, SR component 276 within routing component 244 of router 200 creates the transport endpoint segment having the mandatory attribute identifying the address of the second router in response to receipt of configuration information from admin 268 via CLI 278. SR component 276 activates the transport endpoint segment in response to the establishment of at least one qualified intra-domain tunnel to which to bind the transport endpoint segment. In this example, a qualified intra-domain tunnel comprises a tunnel originated at router 200 and having reachability to the address of the second router identified in the mandatory endpoint address attribute of the transport endpoint segment. When there is no qualified intra-domain tunnel to which to bind the transport endpoint segment, the transport endpoint segment remains in an inactive state. SR component 276 may delete the transport endpoint segment in response to receipt of configuration information from admin 268 via CLI 278.

As another example, router 200 may perform dynamic provisioning of the transport endpoint segment. In this example, SR component 276 of router 200 creates the transport endpoint segment having the mandatory attribute identifying the address of the second router in response to the establishment of at least one qualified intra-domain tunnel to which to bind the transport endpoint segment. When the last qualified intra-domain tunnel to which to bind the transport endpoint segment is gone, SR component 276 deletes the transport endpoint segment.

Upon provisioning the transport endpoint segment, router 200 advertises a TESID allocated for the transport endpoint segment (402). Within the advertisements, the TESID is encoded as a MPLS label for the transport endpoint segment. In some cases, SR component 276 may allocate the TESID for the newly provisioned transport endpoint segment. In other examples, admin 268 may allocate or assign the TESID for the newly provisioned transport endpoint segment via CLI 278. In accordance with the techniques described in this disclosure, router 200 advertises the same TESID for the transport endpoint segment regardless of which intra-domain tunnel is bound to the transport endpoint segment.

As one example, in cases were router 200 comprises a border router included in the first domain and a second domain of the network, SR component 276 of router 200 may use BGP 271 to advertise the TESID for the transport endpoint segment in BGP messages to at least other border routers of the first domain and the second domain. As another example, in cases were router 200 comprises a border router included in the first domain and a second domain of the network, SR component 276 of router 200 may use BGP-LS 272 to advertise the TESID for the transport endpoint segment in BGP-LS messages to controller device 128 configured to manage at least the first domain and the second domain.

Router 200 binds the transport endpoint segment to a first intra-domain tunnel originated at router 200 and having reachability to the second router (404). As described above, the transport endpoint segment is defined by at least the mandatory endpoint address attribute and, in some cases, one or more optional attributes, e.g., a color attribute, TE attributes, and the like. In one example, routing component 244 may select the first intra-domain tunnel as being the first qualified intra-domain tunnel that has at least the mandatory endpoint address attribute of the transport endpoint segment. In another example, routing component 244 may select the first intra-domain tunnel as being the one of a plurality of qualified intra-domain tunnels that has the mandatory endpoint address attribute and has more of the optional attributes than the other tunnels of the plurality of qualified intra-domain tunnels. In some scenarios, routing component 244 may bind the transport endpoint segment to two or more qualified intra-domain tunnels in an equal cost multipath or a weighted equal cost multipath manner.

In order to bind the transport endpoint segment to the first intra-domain tunnel, routing component 244 records a mapping between the TESID and the first intra-domain tunnel in TESID mapping table 284 of router 200. Routing component 244 then installs a route for the TESID in routing information 260 and installs a next hop for the TESID in forwarding information 262 of forwarding component 246 using forwarding state for the first intra-domain tunnel bound to the transport endpoint segment. Upon receipt of packets including the TESID for the transport endpoint segment via IFCs 254, forwarding component 246 of router 200 forwards the packets toward the second router in accordance with the first intra-domain tunnel (406).

Router 200 later updates the binding of the transport endpoint segment to a second intra-domain tunnel originated at router 200 and having reachability to the second router (408). The binding update may be performed due to state change, deconfiguration, demotion, or the like, of the first intra-domain tunnel. In order to update the binding of the transport endpoint segment to the second intra-domain tunnel, routing component 244 updates the mapping recorded in TESID mapping 284 of router 200 to associate the TESID and the second intra-domain tunnel. Routing component 244 then updates the route for the TESID in routing information 260 and updates the next hop for the TESID installed in forwarding information 262 of forwarding component 246 using forwarding state for the second intra-domain tunnel. According to the techniques described in this disclosure, routing component 244 updates the binding of transport endpoint segment without advertising the updated binding to either controller device 128 or other border routers within the network. After the update, upon receipt of packets including the same TESID for the transport endpoint segment via IFCs 254, forwarding component 246 of router 200 forwards the packets toward the second router in accordance with the second intra-domain tunnel (410).

Figure 5:
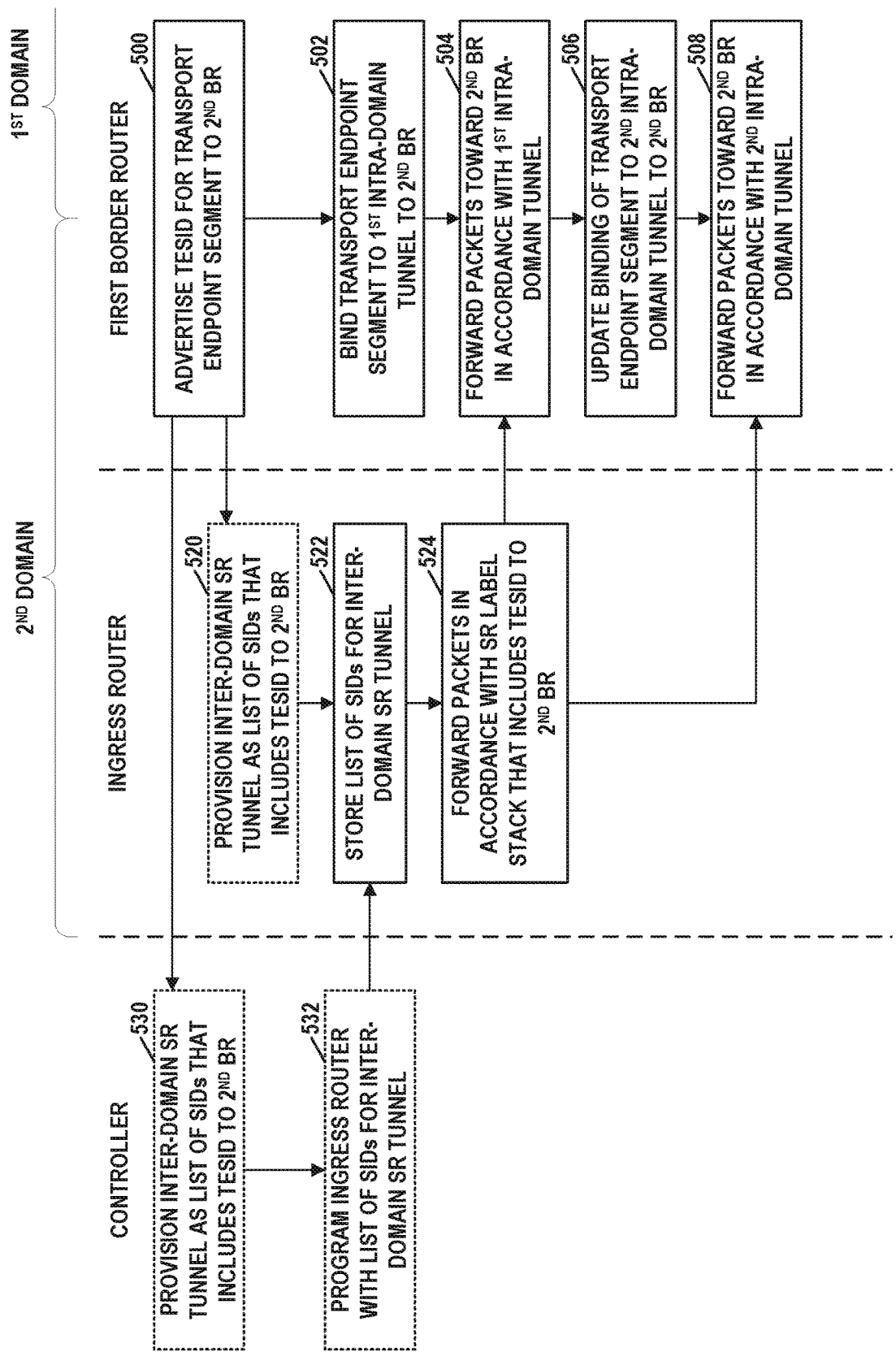
FIG. 5 is a flowchart illustrating an example operation of a border router and an ingress router in a network using transport endpoint segments for inter-domain segment routing, in accordance with the techniques of this disclosure.

FIG. 5 is a flowchart illustrating an example operation of a border router and an ingress router in a network using transport endpoint segments for inter-domain segment routing, in accordance with the techniques of this disclosure. The example operation is described herein with respect to components within network 100 of FIG. 1, including first border router 112B included in first domain 114B and second domain 114A, ingress router 112A included in second domain 114A, and, optionally, controller device 128 configured to manage at least first domain 114B and second domain 114A. Similar operations may be performed by any combination of border routers 112.

First border router 112B advertises a TESID allocated for transport endpoint segment 130 that represents any intra-domain tunnel originated at first border router 112B and having reachability to second border router 112C included in first domain 114B (500). First border router 112B may advertise the TESID for transport endpoint segment 130 to one or more of controller device 128 and other border routers 112A, 112C, 112E, 112F within first domain 114B and second domain 114A. Within the advertisements, the TESID is encoded as a MPLS label for the transport endpoint segment.

In an example of controller-based inter-domain SR provisioning, controller device 128 receives the TESID for transport endpoint segment 130 in BGP-LS messages from first border router 112B. Controller device 128 provisions inter-domain segment routing tunnel 140 as a list of SIDs that at least includes the TESID for transport endpoint segment 130 to second border router 112C (530). Controller device 128 programs ingress router 112A with the list of SIDs for inter-domain segment routing tunnel 140 (532). In an alternative example of BGP signaling-based inter-domain SR provisioning, ingress router 112A receives the TESID for transport endpoint segment 130 in BGP messages from first border router 112B. Ingress router 112A provisions inter-domain segment routing tunnel 140 as a list of SIDs that at least includes the TESID for transport endpoint segment 130 to second border router 112C (520).

Regardless of how inter-domain segment routing tunnel 140 is provisioned, ingress router 112A stores the list of SIDs for inter-domain segment routing tunnel 140 (522). Ingress router 112A then encapsulates packets destined for egress router 112D of inter-domain segment routing tunnel 140 with a segment routing label stack for inter-domain segment routing tunnel 140 that at least includes the TESID for transport endpoint segment 130 to second border router 112C. Ingress router 112A forwards the encapsulated packets in accordance with the segment routing label stack (524).

Upon receipt of the packets having the segment routing label stack including the TESID for transport endpoint segment 130 to second border router 112C, first border router 112B forwards the packets toward second border router 112C in accordance with whichever intra-domain tunnel 118A, 118B is currently bound to transport endpoint segment 130. As a more specific example, first border router 112B binds transport endpoint segment 130 to first intra-domain tunnel 118A originated at first border router 112B and having reachability to second border router 112C (502). Upon receipt of the packets from ingress router 112A having the segment routing label stack including the TESID for transport endpoint segment 130, first border router 112B forwards the packets toward second border router 112C in accordance with first intra-domain tunnel 118A (504).

First border router 112B later updates the binding of transport endpoint segment 130 to second intra-domain tunnel 118B originated at first border router 112B and having reachability to second border router 112C (506). In accordance with the techniques described in this disclosure, first border router 112B updates the binding of transport endpoint segment 130 without notifying ingress router 112A of the update, either directly or via controller device 128, and without ingress router 112A storing an updated list of SIDs for inter-domain segment routing tunnel 140. After the update, upon receipt of the packets having the segment routing label stack including the same TESID for transport endpoint segment 130, first border router 112B forwards the packets toward second border router 112C in accordance with second intra-domain tunnel 118B (508).

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combination of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. The term "computer-readable storage media" refers to physical storage media, and not signals, carrier waves, or other transient media.

Various aspects of the techniques have been described. These and other aspects are within the scope of the following claims.

What is claimed is:

1. A method comprising:
provisioning, by a first router included in a first domain of a network, a transport endpoint segment that represents any intra-domain tunnel originated at the first router and having reachability to a second router included in the first domain;
advertising, by the first router, a transport endpoint segment identifier (TESID) allocated for the transport endpoint segment;
binding, by the first router, the transport endpoint segment to a first intra-domain tunnel originated at the first router and having reachability to the second router;
upon receipt of packets including the TESID for the transport endpoint segment, forwarding the packets from the first router and toward the second router in accordance with the first intra-domain tunnel;
updating, by the first router, the binding of the transport endpoint segment to a second intra-domain tunnel originated at the first router and having reachability to the second router; and
after the update, upon receipt of packets including the same TESID for the transport endpoint segment, forwarding the packets from the first router and toward the second router in accordance with the second intra-domain tunnel.

2. The method of claim 1, wherein advertising the TESID for the transport endpoint segment comprises advertising the same TESID for the transport endpoint segment regardless of which intra-domain tunnel is bound to the transport endpoint segment.

3. The method of claim 1, wherein provisioning the transport endpoint segment comprises:
creating the transport endpoint segment having at least one attribute identifying an address of the second router in response to receipt of configuration information from an administrator via an interface of the first router; and
activating the transport endpoint segment in response to establishment of at least one qualified intra-domain tunnel to which to bind the transport endpoint segment, wherein the at least one qualified intra-domain tunnel has the at least one attribute of the transport endpoint segment, and wherein the first and second intra-domain tunnels comprise qualified intra-domain tunnels.

4. The method of claim 1, wherein provisioning the transport endpoint segment comprises dynamically creating the transport endpoint segment having at least one attribute identifying an address of the second router in response to establishment of at least one qualified intra-domain tunnel to which to bind the transport endpoint segment, wherein the at least one qualified intra-domain tunnel has the at least one attribute of the transport endpoint segment, and wherein the first and second intra-domain tunnels comprise qualified intra-domain tunnels.

5. The method of claim 1, wherein the first router comprises a border router included in the first domain and a second domain of the network, and wherein advertising the TESID for the transport endpoint segment comprises sending border gateway protocol (BGP) messages to at least other border routers of the first domain and the second domain of the network.

6. The method of claim 1, wherein the first router comprises a border router included in the first domain and a second domain of the network, and wherein advertising the TESID for the transport endpoint segment comprises sending border gateway protocol link state (BGP-LS) messages to a controller device configured to manage at least the first and second domains of the network.

7. The method of claim 1, wherein binding the transport endpoint segment to the first intra-domain tunnel comprises:
recording a mapping between the TESID and the first intra-domain tunnel in a control plane of the first router; and
installing a next hop for the TESID in the forwarding plane of the first router using forwarding state for the first intra-domain tunnel bound to the transport endpoint segment.

8. The method of claim 7, wherein updating the binding of the transport endpoint segment to the second intra-domain tunnel comprises:
updating the mapping recorded in the control plane of the first router to associate the TESID and the second intra-domain tunnel; and updating the next hop for the TESID installed in the forwarding plane of the first router to use forwarding state for the second intra-domain tunnel, wherein the first router updates the binding without advertising the updated binding.

9. The method of claim 1, wherein binding the transport endpoint segment comprises binding the transport endpoint segment to the first intra-domain tunnel and a third intra-domain tunnel in an equal cost multipath or a weighted equal cost multipath manner.

10. The method of claim 1, wherein the transport endpoint segment is defined by at least one mandatory endpoint address attribute and one or more optional attributes, and wherein binding the transport endpoint segment to the first intra-domain tunnel comprises selecting the first intra-domain tunnel as one of:
  a first qualified intra-domain tunnel that has at least the mandatory endpoint address attribute of the transport endpoint segment; or
  one of a plurality of qualified intra-domain tunnels that has the mandatory endpoint address attribute and has more of the optional attributes than other tunnels of the plurality of qualified intra-domain tunnels.

11. The method of claim 1, wherein, based on the advertisement of the TESID for the transport endpoint segment, one of an ingress router included in a second domain of the network or a controller device that manages at least the first and second domains provisions an inter-domain segment routing tunnel as a list of segment identifiers (SIDS) that at least includes the TESID for the transport endpoint segment to the second router, and the ingress router forwards the packets in accordance with a segment routing label stack for the inter-domain segment routing tunnel that at least includes the TESID for the transport endpoint segment to the second router.

12. A first router included in a first domain of a network, the first router comprising:
  one or more interfaces; and
  a control unit in communication with the one or more interfaces, the control unit comprising one or more processors configured to:
    provision a transport endpoint segment that represents any intra-domain tunnel originated at the first router and having reachability to a second router included in the first domain;
    advertise a transport endpoint segment identifier (TESID) allocated for the transport endpoint segment;
    bind the transport endpoint segment to a first intra-domain tunnel originated at the first router and having reachability to the second router;
    upon receipt of packets including the TESID for the transport endpoint segment, forward the packets from the first router and toward the second router in accordance with the first intra-domain tunnel;
    update the binding of the transport endpoint segment to a second intra-domain tunnel originated at the first router and having reachability to the second router; and
    after the update, upon receipt of packets including the same TESID for the transport endpoint segment, forward the packets from the first router and toward the second router in accordance with the second intra-domain tunnel.

13. The first router of claim 12, wherein, to provision the transport endpoint segment, the one or more processors are configured to:
  create the transport endpoint segment having at least one attribute identifying an address of the second router in response to receipt of configuration information from an administrator via an interface of the first router; and
  activate the transport endpoint segment in response to establishment of at least one qualified intra-domain tunnel to which to bind the transport endpoint segment, wherein the at least one qualified intra-domain tunnel has the at least one attribute of the transport endpoint segment, and wherein the first and second intra-domain tunnels comprise qualified intra-domain tunnels.

14. The first router of claim 12, wherein, to provision the transport endpoint segment, the one or more processors are configured to dynamically create the transport endpoint segment having at least one attribute identifying an address of the second router in response to establishment of at least one qualified intra-domain tunnel to which to bind the transport endpoint segment, wherein the at least one qualified intra-domain tunnel has the at least one attribute of the transport endpoint segment, and wherein the first and second intra-domain tunnels comprise qualified intra-domain tunnels.

15. The first router of claim 12, wherein, to bind the transport endpoint segment to the first intra-domain tunnel, the one or more processors are configured to:
  record a mapping between the TESID and the first intra-domain tunnel in a control plane of the first router; and
  install a next hop for the TESID in the forwarding plane of the first router using forwarding state for the first intra-domain tunnel bound to the transport endpoint segment.

16. The first router of claim 15, wherein, to update the binding of the transport endpoint segment to the second intra-domain tunnel, the one or more processors are configured to:
  update the mapping recorded in the control plane of the first router to associate the TESID and the second intra-domain tunnel; and
  update the next hop for the TESID installed in the forwarding plane of the first router to use forwarding state for the second intra-domain tunnel, without advertising the updated binding.

17. A system comprising:
  a first border router included in a first domain and a second domain of a network, the first border router configured to advertise a transport endpoint segment identifier (TESID) allocated for a transport endpoint segment that represents any intra-domain tunnel originated at the first border router and having reachability to a second border router included in the first domain; and
  an ingress router included in the second domain of the network, the ingress router configured to:
    store an inter-domain segment routing tunnel as a list of segment identifiers (SIDS) that at least includes the TESID for the transport endpoint segment to the second border router; and
    forward packets destined for an egress router of the inter-domain segment routing tunnel in accordance with a segment routing label stack for the inter-domain segment routing tunnel that at least includes the TESID for the transport endpoint segment to the second border router, and
  wherein the first border router is further configured to:
    bind the transport endpoint segment to a first intra-domain tunnel originated at the first border router and having reachability to the second border router;

upon receipt of the packets having the segment routing label stack including the TESID for the transport endpoint segment to the second border router, forward the packets from the first border router and toward the second border router in accordance with the first intra-domain tunnel;

update the binding of the transport endpoint segment to a second intra-domain tunnel originated at the first border router and having reachability to the second border router; and after the update, upon receipt of the packets having the segment routing label stack including the same TESID for the transport endpoint segment to the second border router, forward the packets from the first border router and toward the second border router in accordance with the second intra-domain tunnel.

18. The system of claim 17, further comprising a controller device configured to manage at least the first and second domains of the network, wherein the controller device is configured to:

receive border gateway protocol link state (BGP-LS) messages from the first border router that advertise the TESID for the transport endpoint segment to the second border router;

provision the inter-domain segment routing tunnel as the list of SIDs that at least includes the TESID for the transport endpoint segment to the second border router; and program the ingress router with the list of SIDs for the inter-domain segment routing tunnel.

19. The system of claim 17, wherein the ingress router is configured to:

receive border gateway protocol (BGP) messages from the first border router that advertise the TESID for the transport endpoint segment to the second border router; and provision the inter-domain segment routing tunnel as the list of SIDs that at least includes the TESID for the transport endpoint segment to the second border router.

\* \* \* \* \*